United States Patent [19]

Gachot

[11] 4,055,323

[45] Oct. 25, 1977

[54] BUTTERFLY VALVE

[76] Inventor: Jean Gachot, 26 bis, Avenue de Paris, Soisy-sous-Montmorency, Val-d'Oise, France

[21] Appl. No.: 657,536

[22] Filed: Feb. 12, 1976

[30] Foreign Application Priority Data

Feb. 18, 1975 France .................. 75.04967

[51] Int. Cl.² .............................. F16K 1/22
[52] U.S. Cl. ............................. 251/306
[58] Field of Search .......... 251/305, 306, 307, 308; 277/179

[56] References Cited

U.S. PATENT DOCUMENTS

| 2,755,113 | 7/1956 | Baumheckel | 277/179 |
|---|---|---|---|
| 2,797,944 | 7/1957 | Riesing | 277/179 |
| 2,809,060 | 10/1957 | Thompson | 251/306 |
| 3,048,363 | 8/1962 | Garrigan | 251/307 |
| 3,552,407 | 1/1971 | Hirano | 251/306 |
| 3,565,395 | 2/1971 | Hansen | 251/306 |
| 3,666,236 | 5/1972 | Gachot | 251/306 |
| 3,771,763 | 11/1973 | Myers | 251/306 |

FOREIGN PATENT DOCUMENTS

| 695,037 | 7/1960 | Canada | 251/306 |
|---|---|---|---|
| 1,255,873 | 5/1960 | France | 251/305 |
| 1,600,800 | 4/1970 | Germany | 251/306 |
| 1,251,117 | 9/1967 | Germany | 251/306 |

Primary Examiner—William R. Cline
Assistant Examiner—H. Jay Spiegel
Attorney, Agent, or Firm—Young & Thompson

[57] ABSTRACT

A butterfly valve designed primarily for piping systems in which corrosive fluids are circulated at high temperature comprises a pivotally mounted disc having a convex annular edge portion associated with an annular seal which projects within the valve passage. The seal is formed by a specially shaped removable metallic ring coated with plastic material and having a flared cylindrical mouthpiece which is applied in fluid-tight contact with the edge portion of the valve disc and held in position within the valve passage by a retaining ring.

2 Claims, 6 Drawing Figures

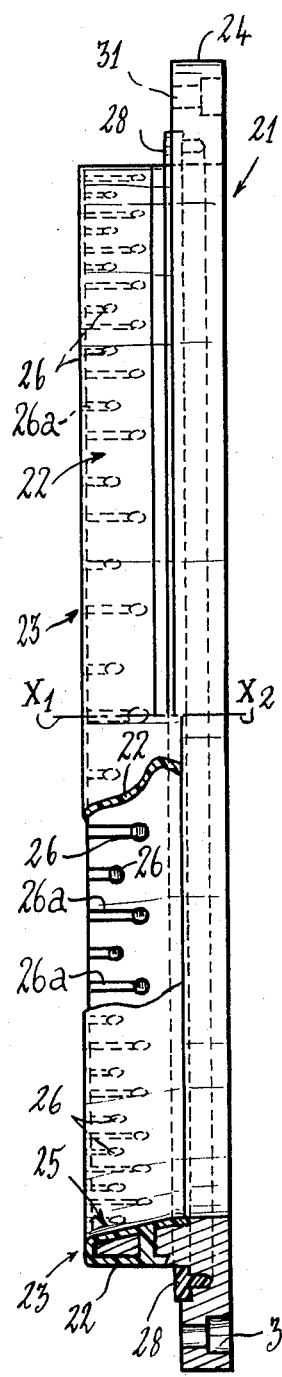
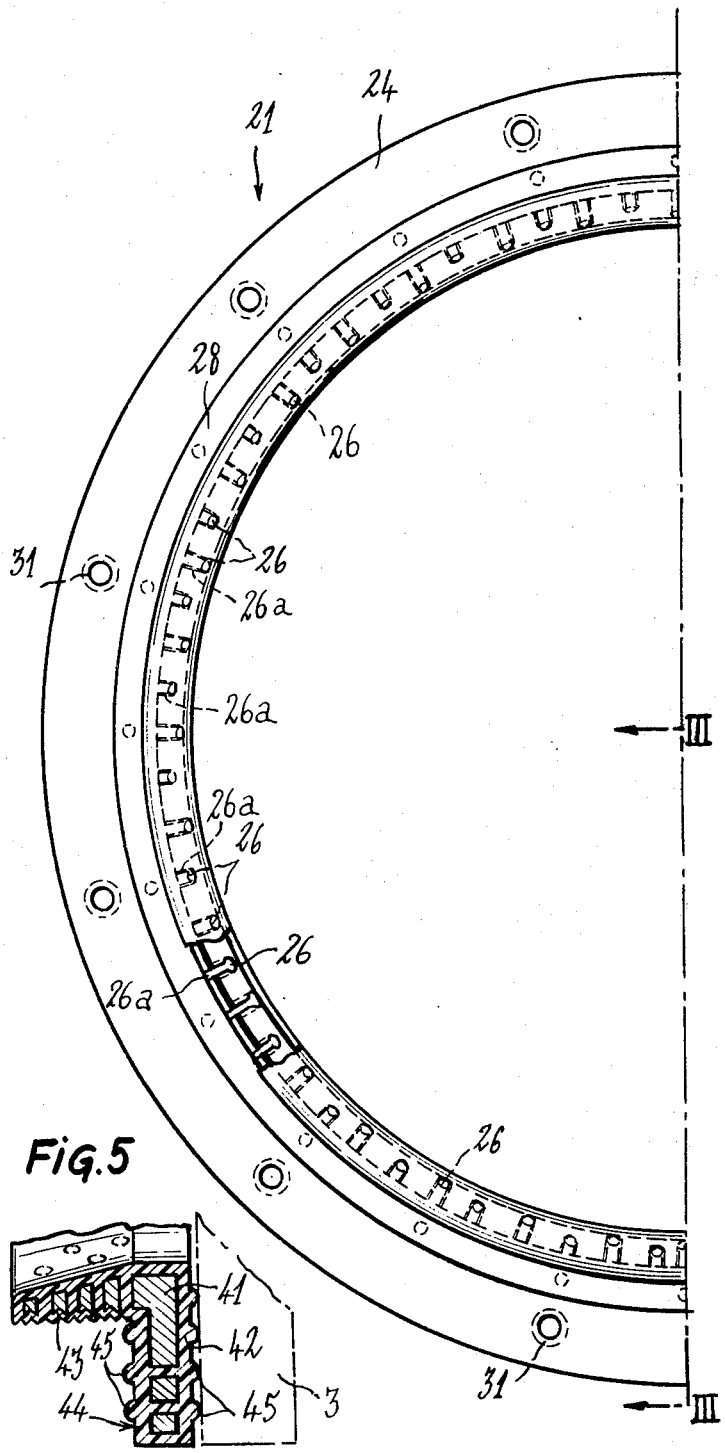
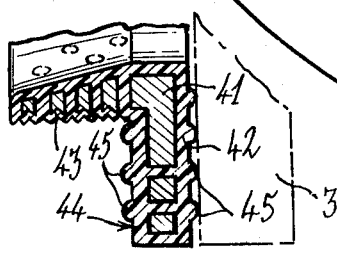

BUTTERFLY VALVE

This invention relates to a butterfly valve having a body pierced by an axial passage designed to come into position opposite to two adjacent portions of a piping system between which the valve can be mounted. A valve closure disc mounted for rotation within the valve passage about an axis which is transverse to said passage and displaced with respect to its axis of rotation is provided at its periphery with an annular edge portion having a convex profile associated with an annular seal which is mounted so as to project within the passage. In the position of closure, the annular bearing face of the edge portion of the valve disc is applied against the annular seal.

There are many known designs of butterfly valves of the type described above. It has been proved by experience that known valves are subject to a number of disadvantages, especially as a result of lack of endurance of the seal associated with the edge portion of the valve disc with respect to deleterious or abrasive fluids and either high or very low temperatures. Moreover, the positioning of the annular seal within the valve passage is often imprecise, both the assembly and replacement of the seal being attended by a number of practical difficulties in the case of known valves.

The aim of the invention is to overcome the disadvantages mentioned in the foregoing by making it possible to construct in a simple manner a butterfly valve of the type specified in which the seal offers long-term endurance with respect to deleterious or abrasive fluids as well as high or very low temperatures. A further aim of the invention is to improve the positioning of the annular seal which is fitted within the valve passage and to facilitate assembly and replacement of said seal.

The invention is directed to a butterfly valve having a body pierced by an axial passage designed to come into position opposite to two adjacent portions of a piping system; a valve closure disc mounted for rotation within the valve passage about an axis which is transverse to said passage is displaced with respect to its axis of rotation and provided at its periphery with an annular edge portion having a convex profile associated with an annular seal which is mounted so as to project within the valve passage.

In accordance with the invention, the butterfly valve aforesaid is distinguished by the fact that the seal associated with the edge portion of the valve disc comprises a removable metallic sectional ring coated at least partially with plastic material, the sectional ring being provided with a substantially cylindrical mouthpiece mounted in fluid-tight manner within one end portion of the valve passage, the internal surface of said mouthpiece being such as to have a profile which is flared in the direction of the axis of the valve disc whose peripheral edge portion is capable of bearing against said internal surface in fluid-tight manner; retaining means are provided for maintaining the sectional ring within the valve passage in a predetermined position with respect to the valve disc.

This arrangement facilitates machining of the valve body and replacement of the seal which is associated with the valve disc. The endurance of said seal is substantially improved, especially by virtue of the simplicity of its assembly and of the shape of the seal.

Further particular features and advantages of the invention will become apparent from the following description of a few embodiments of the improvements aforementioned as will be presented hereinafter by way of example but not in any limiting sense, reference made to the accompanying drawings, in which:

FIGS. 3 and 4 show respectively in a front view and in a part-sectional view the removable sectional ring which constitutes the valve-disc seal of the valve shown in FIGS. 1 and 2;

FIG. 5 is a fragmentary part-sectional view which is similar to FIG. 3 and shows an alternative form of construction of the shaped seal;

Figure 2:
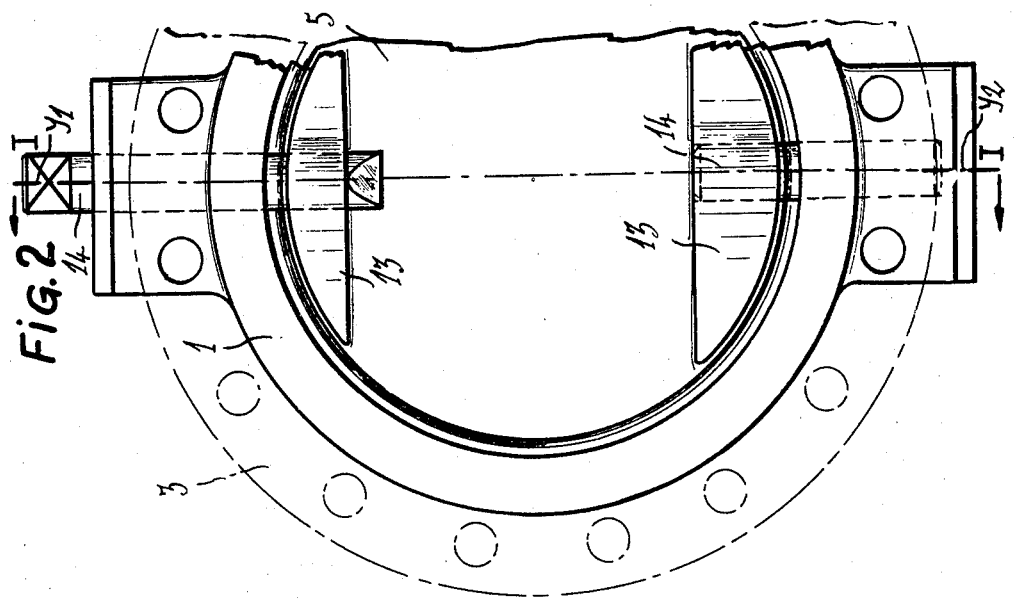
FIG. 2 is a front view of the valve shown in FIG. 1.
Figure 1:
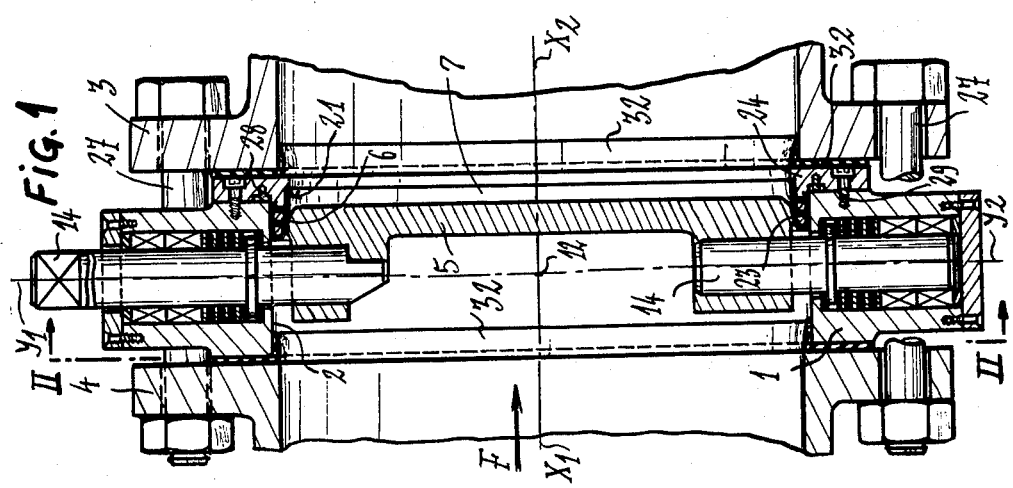
FIG. 1 is an axial sectional view of a valve which is endowed with the improvements in accordance with the present invention.
Figure 6:
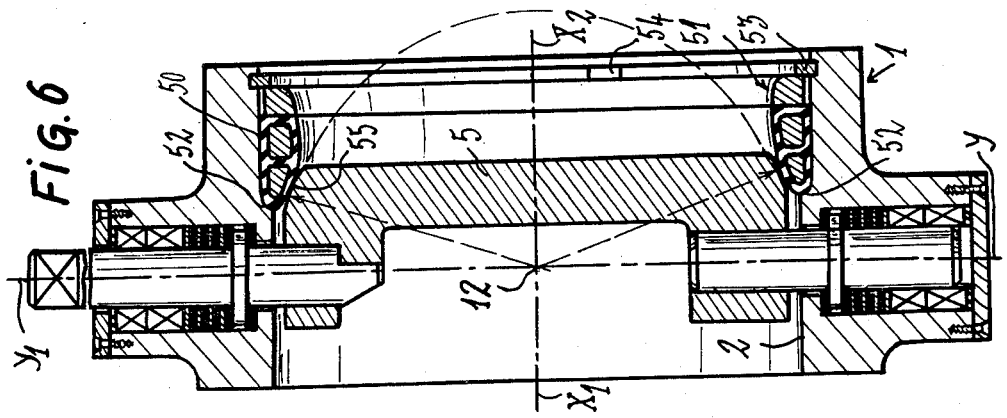

FIG. 6 which is similar to FIG. 1 shows another alternative embodiment of the shaped seal.

In the embodiment which is illustrated in FIG. 1, the butterfly valve has a body 1 in which is pierced a passage 2 along an axis X1-X2, said valve passage being intended to be placed opposite to two adjacent portions 3, 4 of a piping system. A valve closure disc 5 rotatably mounted on the body 1 with respect to an axis of rotation Y1-Y2 is displaced with respect to said axis and provided at its periphery with an annular edge portion 6 having a convex and preferably spherical profile, said edge portion being associated with an annular seal 7 which projects within the interior of the valve passage 2. In the case of a spherical valve-disc profile, the center of the sphere is located at 12 and coincides with the intersection of the axes X1-X2 and Y1-Y2.

In accordance with the invention, the seal associated with the annular edge portion 6 of the valve disc 5 comprises a removable metallic ring 21 having a L-section profile (FIGS. 3 and 4). Said ring is coated partially with plastic material 22 such as polytetrafluoroethylene or fluorinated propylene-ethylene or having a base of perfluoroalkoxy resin or any other polyfluorinated plastic material, or alternatively polyethylene of high molecular weight which affords resistance to ageing and the deleterious and abrasive agents which may be employed. This plastic coating 22 is formed in a thin film, especially on a projecting and substantially cylindrical mouthpiece 23 which is adapted to engage in one end of the valve passage 2 in fluid-tight manner (as shown in FIG. 1) and joined to a radial flange 24 having a larger external diameter than that of said mouthpiece 23.

The plastic coating 22 preferably has a thickness of 0.5 to 3 mm, depending on the caliber of the valve. Said coating is formed by overmolding in the hot state in the vicinity of the softening temperature of the plastic material. That portion of the metallic ring 21 which is intended to receive the plastic coating preferably has a rough surface such as a rough-cast surface, for example, in order to facilitate adhesion of the coating. Anchoring of the coating can be improved by means of radial holes 26 formed in the mouthpiece 23 (as shown in FIGS. 3 and 4).

The internal wall 25 of the mouthpiece 23 has a flared profile opposite to the flange 24. In the service position (shown in FIG. 1), said flared portion is oriented towards the axis Y1-Y2 of the valve disc 5 whose peripheral edge portion 6 can be applied against the internal wall 25 in fluid-tight manner by bearing against the plastic coating 22 which forms a seating.

Clamping means consisting of tie-bolts 27 (as shown in FIG. 1) and connecting the flanges 3, 4, of the adjacent pipe sections serve to apply the flange 3 of an adjacent pipe section in fluid-tight manner against that face of the flange 24 of the metallic ring 21 which is remote from the mouthpiece 23.

The fluid-tight application of the flange 24 of the sectional ring 21 against the valve body 1 is ensured for example by means of an annular seal 28 mounted within a groove of the flange 24 at the point of junction of this latter with the mouthpiece 23. Said seal 28 is clamped in position by means of bolts 29 which are screwed into the valve body 1 and passed through holes 31 of the flange 24 (as shown in FIGS. 3 and 4). Fluid-tightness can thus be ensured by means of an overmolded coating of plastic material which is similar to the coating 22 of the mouthpiece 23.

The flanges 3, 4 of the adjacent pipe sections (as shown in FIG. 1) are clamped respectively against one face of the sectional ring 21 and against the opposite face of the valve body 1 by means of tie-bolts 27. On these two bearing faces, fluid-tightness can be ensured for example by means of seals 32 having a flat annular portion engaged between the opposite faces of the flanges 3, 4 and of the valve body 1 or of the ring 21. A cylindrical extension is joined to the above-mentioned annular portion of the seal 32 and engaged in the adjacent pipe section or in the passage of the valve body 1. Said annular extension preferably has a flattened edge profile which is oppositely oriented with respect to the intended direction of flow within the valve passage 2 (as shown by the arrow F). This accordingly facilitates the maintenance of the seals 32 in the service position and rapid mounting of the valve against the pipe-flanges 3, 4.

The arrangements which have just been mentioned make it possible to produce a reinforced seal which is highly efficient and offers a long service life, especially in the case of valves which operate under very exacting conditions. A valve designed in accordance with these arrangements has operated satisfactorily at temperatures ranging from +250° C to −180° C. It is an easy matter to keep spare interchangeable sectional rings 21 in readiness and the coating 22 of these latter can be prepared in accordance with requirements. This arrangement is particularly advantageous in the case of valves of large caliber, for example in the case of valve passages exceeding 150 mm in diameter. It is in fact possible by means of this arrangement to ensure that the shape and the profile of the seals are maintained with precision prior to fitting in the valve by virtue of the stiffness of the metallic ring 21. It is thus found that the invention makes it possible to combine the functions of seating and of seal for the valve disc within a single component which is readily interchangeable, namely the ring 21.

The L-section seals 32 which can also be formed if necessary by overmolding of metallic rings of similar design to the ring 21 offer the same advantage of stiffness and ease of assembly. The thickness, the weight and the cost price of all these seals can thus be reduced to an appreciable extent.

It is readily apparent that the invention is not limited to the embodiment which has just been described by way of example and that many alternatives may accordingly be contemplated without thereby departing either from the scope or the spirit of the invention.

From this it follows that, as shown in FIG. 5, the L-section ring 41 can be completely coated with plastic material 42.

The periphery of the mouthpiece can advantageously be provided with a threaded portion 43 and the plastic coating also follows the shape of this latter, thus making it possible to fix the ring 41 by screwing into the valve body 1 which is provided for this purpose with an internally threaded portion. This arrangement makes it possible to dispense with the seal 28 of the previous embodiment.

In these different forms of execution, the flared shape of the mouthpiece 23 of the ring 21 in conjunction with the sheathing of plastic material permits fluid-tight application of the valve disc 5 even if the profile of this latter is not perfectly spherical. Moreover, the fact that the plastic material is present in a thin film prevents creep deformation, with the result that fluid-tightness is maintained during use.

In order to improve fluid-tightness of application of the coated ring 41 (FIG. 5) against the valve body 1 or against the flange 3 of an adjacent pipe section, concentric annular ribs 45 having a corrugated profile, for example, can be formed on the plastic coating of the radial flange 44 on each face of this latter.

There is shown in FIG. 6 another advantageous alternative form of construction of the valve-disc seal in accordance with the invention.

The shaped ring 51 of stainless steel, for example, is fitted within an enlarged entrance 50 of the valve passage 2 and maintained applied against an annular shoulder 52 of said passage in proximity to the axis of rotation Y1-Y2 of the valve disc 5. Preferably, the shaped ring 51 is provided with a plastic coating which is similar to the coating 22 of the ring 21 shown in FIGS. 3 and 4. The plastic coating of the ring 51 is formed over the entire portion which is intended to be applied in fluid-tight manner against the annular shoulder 52 and against the valve disc 5.

The annular shoulder 52 has a profile which corresponds to that of the adjacent portion of the ring 51. This ensures a bearing pressure which is very uniformly distributed over a wide zone of contact between the ring 51 and the valve body 1. A metallic retaining ring 53 serves to hold the shaped ring 51 in position within the entrance 50 of the valve passage 2. The retaining ring 53 is mounted within an annular groove 54 of the passage 2 which is transverse to the axis X1-X2 and is applied against that face of the shaped ring 51 which is remote from the valve disc 5.

In order to improve the endurance of the plastic coating of the ring 51 which is in contact with the edge portion of the valve disc 5, said edge portion is preferably provided with a spherical sector 55 which is centered on the intersection 12 of the axis X1-X2 of the valve passage and the axis of rotation Y1-Y2 of the valve disc. The plastic coating zone of the ring 51 which is intended to be applied in contact with the edge portion of the valve disc 5 is provided at the time of assembly with a slight overthickness with respect to the spherical edge sector 55 in the closed position of the valve disc 5. This ensures the bearing pressure which is necessary for fluid-tightness of the seal provided around the spherical edge sector 55.

In the embodiment which has just been described, the mounting and replacement of the shaped ring 51 are particularly simple and rapid operations. At the time of assembly of the shaped ring 51, said ring is preferably subjected to an effort of axial insertion in the direction of the axis of the valve disc 5. To this end, the valve disc is placed in the open position without coming into contact with the shaped ring. The residual clearance space between the ring 51 and the retaining ring 53 is taken up if necessary by means of an annular packing-piece of suitable thickness (not shown in the drawings). In accordance with an alternative form of construction, the retaining ring 53 could be screwed into the entrance 50 in order to take up any play between the valve disc 5 and the ring 51.

In order to ensure the maximum degree of fluid-tight operation and endurance of the valve in accordance with the invention, experience has shown that it is an advantage to design the metallic ring such as 21 or 51 (shown in FIGS. 1, 3 and 6) so as to give a certain degree of radial elasticity to its mouthpiece such as 23 (FIG. 3) which is located opposite to the valve disc 5. As shown in FIG. 3, the radial elasticity aforesaid can be obtained in particular by forming in the mouthpiece 23 of the metallic ring 21 slots 26a which are parallel to the axis X1-X2 and terminate for example in the anchoring holes 26. By way of example, the slots 26a have a width of the same order as the thickness of the coating 22 whilst the holes 26 have an appreciably larger diameter in order to ensure anchoring of the coating.

Especially in the case of the spherical profile of the edge sector 55 of the valve disc 5 (shown in FIG. 6), the radial elasticity of the mouthpiece of the metallic ring such as 51 achieves an appreciable improvement in the quality and the endurance of the fluid-tight bearing surface of the plastic coating both on the edge sector 55 and on the corresponding zone of the valve body 1 while permitting resilient clamping of the mouthpiece of the ring against the edge sector 55 as each movement of closure of the valve disc 5 takes place.

In the different embodiments described in the foregoing with reference to FIGS. 1 to 6, the metallic ring such as 21, 41, 51 is provided on the side corresponding to the mouthpiece which is associated with the valve disc 5 with an elongated profile in the direction of the axis X1-X2 of the valve passage 2 (as shown in FIGS. 1 and 6). This elongated profile of the ring prevents the effects of vortical motion of the fluid and facilitates the flow of this latter.

Moreover, the elongated profile of the metallic ring 21, 41, 51 ensures that said ring is endowed in all cases with a certain degree of radial elasticity. This elasticity is conducive to smooth operation of the valve and to fluid-tight application of the edge portion of the valve disc 5 against the plastic coating of the ring in the closed position of the valve. Even when the valve is subjected to an intense operating regime, fluid-tightness in the closed position is thus continuously maintained by virtue of the invention.

I claim:

1. A butterfly valve having a body pierced by a passage designed to come into position opposite to two adjacent portions of a piping system, a valve closure disc mounted for rotation within the valve passage about an axis which is transverse to said passage and displaced with respect to its axis of rotation, the valve disc having at its pheriphery an annular edge portion having a convex profile associated with an annular seal which is mounted so as to project within the valve passage, said seal comprising a removable metallic ring coated at least partially with plastic material, the ring having a substantially cylindrical plastic-coated metal mouthpiece mounted within one end portion of the valve passage, the internal surface of said mouthpiece being such as to have a profile which is flared in the direction of the axis of the valve disc whose peripheral edge portion is capable of bearing against said internal surface in fluid-tight manner, retaining means for maintaining the ring within said valve passage in a predetermined position with respect to said valve disc, said ring having an L-section profile metal radial flange integral with the mouthpiece and having a larger diameter than said mouthpiece, the two faces of said flange being capable of bearing in fluid-tight manner against the valve body at the end of the valve passage and against the flange of an adjacent pipe section, the metal mouthpiece of the metallic ring which is mounted within the valve passage being slotted to provide radial elasticity of said mouthpiece, an outer cylindrical surface of said metal mouthpiece being plastic coated and in fluid-tight contact with said one end portion of the valve passage.

2. A butterfly valve as claimed in claim 1, in which said slots are parallel to the axis of the ring.

* * * * *